Oct. 22, 1940.  A. H. LUHRMAN  2,218,849
UNLOADING DEVICE FOR BATTERY GRID PASTING MACHINES
Filed Aug. 9, 1937  4 Sheets-Sheet 1

INVENTOR.
ALBERT H. LUHRMAN.
BY
*H. C. Karel.*
ATTORNEY.

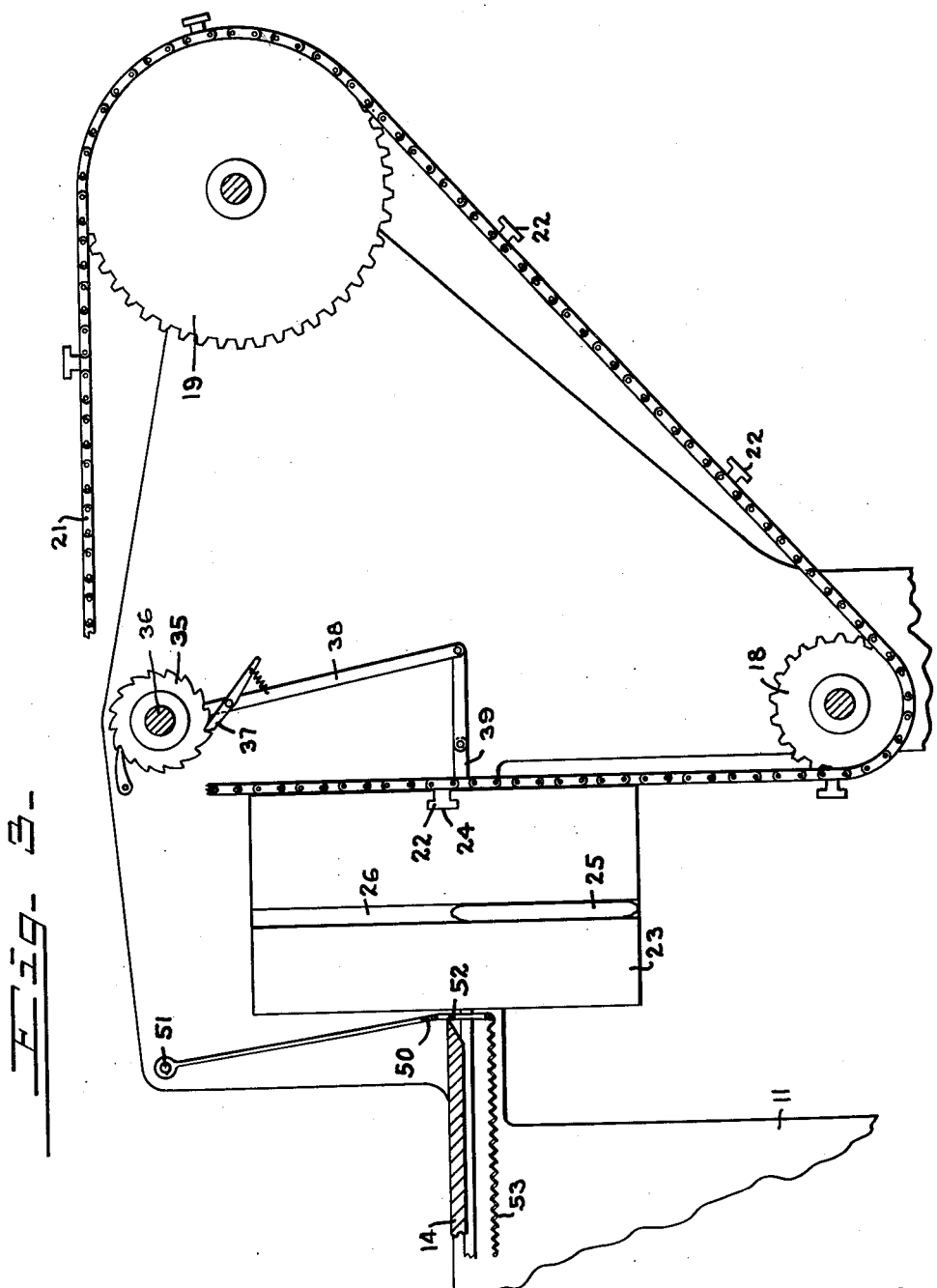

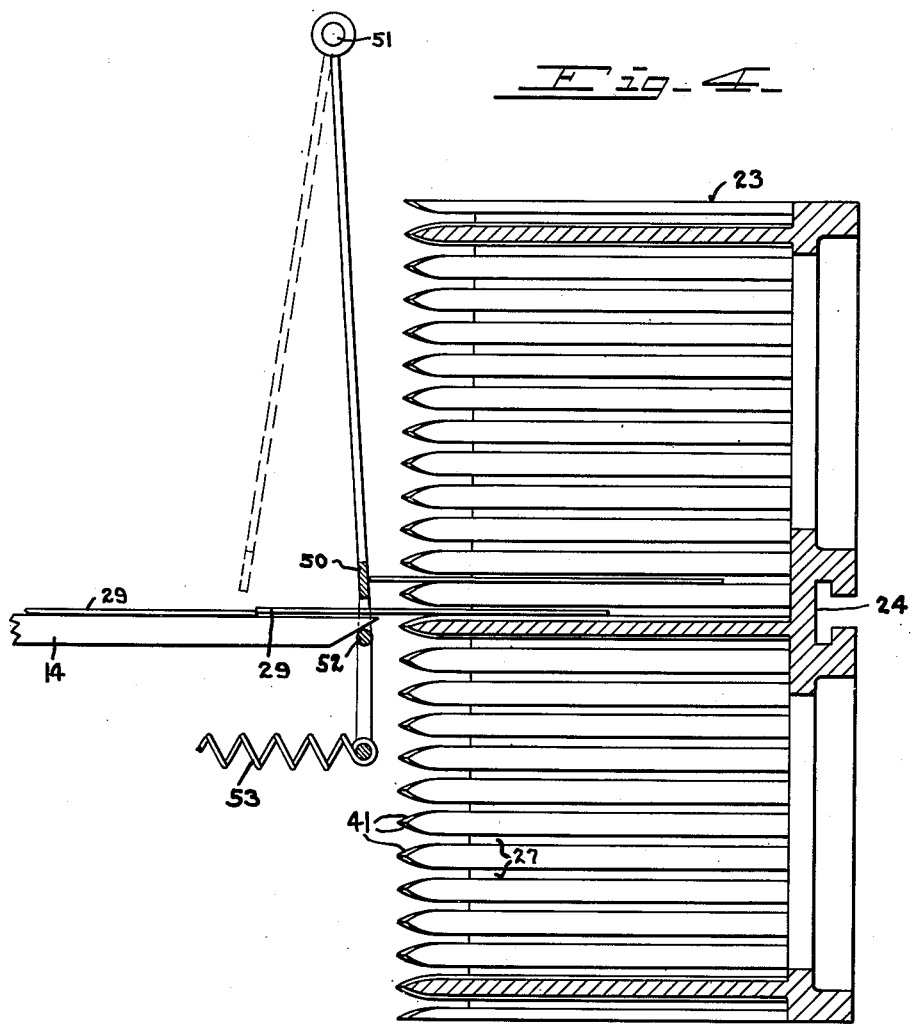

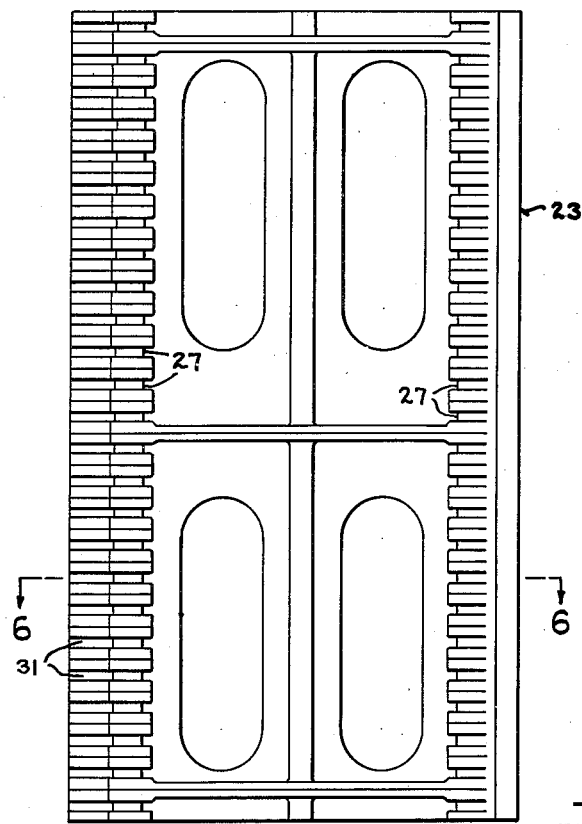
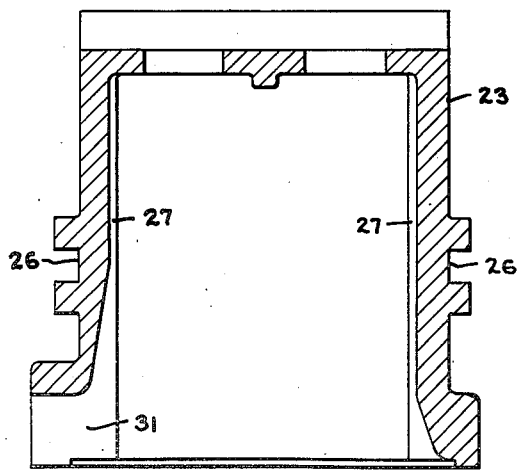
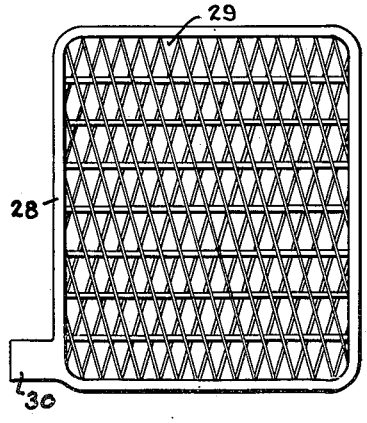

Patented Oct. 22, 1940

2,218,849

UNITED STATES PATENT OFFICE 2,218,849

UNLOADING DEVICE FOR BATTERY GRID PASTING MACHINES

Albert H. Luhrman, Cincinnati, Ohio

Application August 9, 1937, Serial No. 158,055

10 Claims. (Cl. 226—39)

My invention relates to improvements in means for automatically removing plates from a battery grid pasting machine such as shown in my copending patent application Serial No. 158,056, filed August 9, 1937.

In battery grid pasting machines of this character it is desirable that they operate at a high speed and the pasted grids being discharged from the machine being in a wet condition, it is necessary that the plates be dried prior to further manipulations of the plates. Therefore, I provide means for racking the pasted grids as they are ejected from the machine in which racks the plates can be properly dried.

It is the object of my invention to provide a movable rack adjacent to the discharge end of the machine, wherein the pasted grids can be received in spaced relation and the rack containing a plurality of plates can be removed from the machine to any suitable drying apparatus. A further object is to provide a conveyor to which the rack can be attached, which conveyor is operated intermittently in timed relation to the reciprocation of the grid pasting table. A further object is to provide means for guiding the grid rack in the proper relation to the grid pasting table.

My invention will be further readily understood from the following description and claims, and from the drawings in which latter:

Fig. 3 is a longitudinal section of a portion of the machine, taken in the plane of the line 3—3 of Fig. 2.

Fig. 4 is a vertical section, taken in the plane of the line 4—4 of Fig. 2.

Fig. 5 is a front view of the grid rack.

Fig. 6 is a horizontal section of the same, taken on the line 6—6 of Fig. 5, and;

Fig. 7 is a plan view of a grid plate adapted to be pasted on this machine and received in the grid rack.

Figure 1:
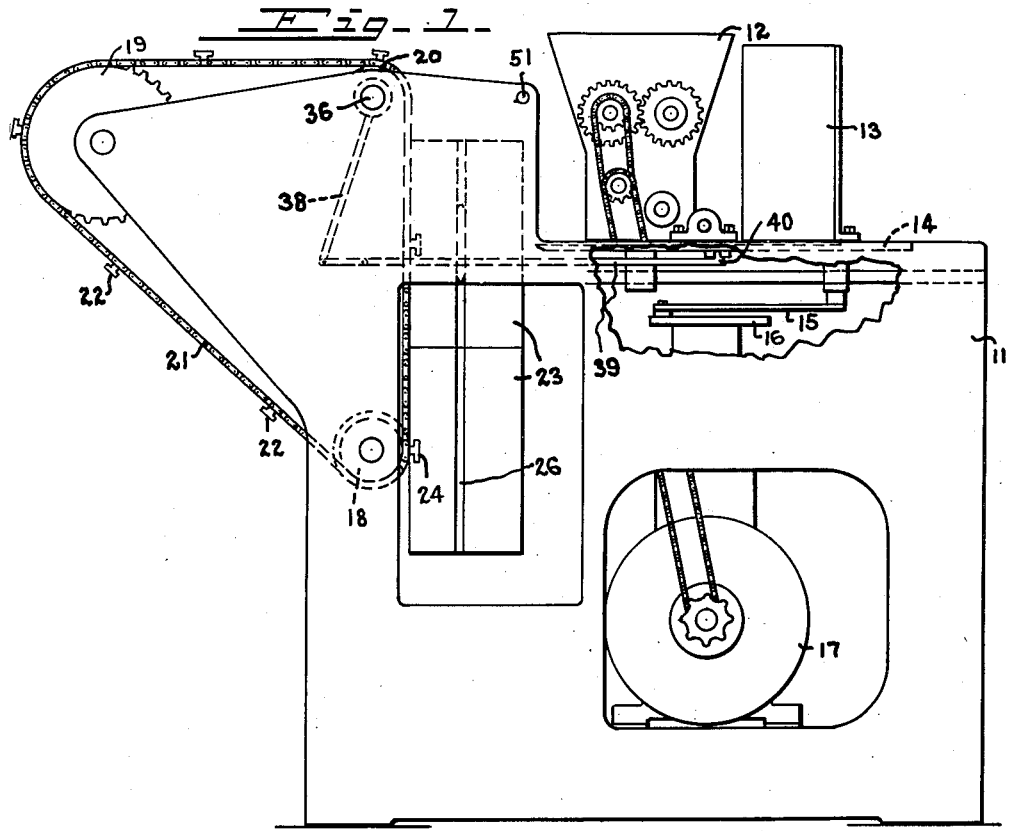
Fig. 1 is a side view of my improved machine partly broken away.
Figure 2:
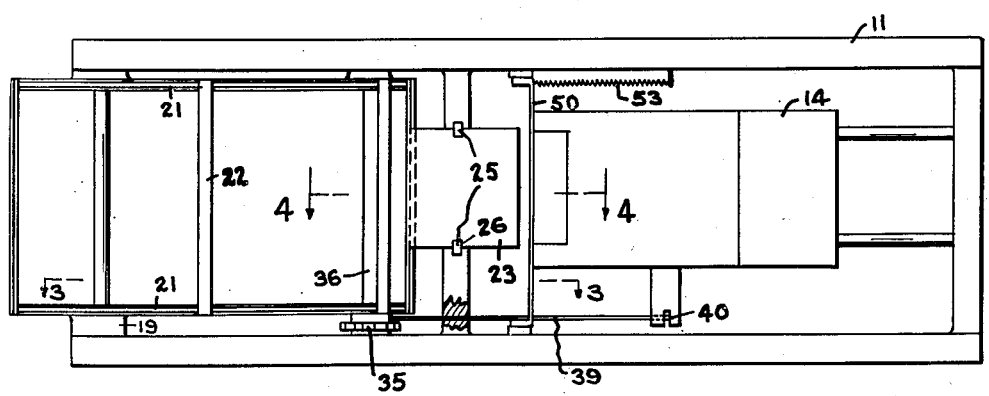
Fig. 2 is a plan view of the same.

The pasting machine comprises a frame 11 having a paste hopper 12 thereon and a grid feeding rack 13. A table 14 is suitably reciprocated by means of a crankrod 15 secured to a plate 16 which is suitably rotated through gearing, not shown, by means of an electric motor 17. The forward or discharge end of the machine supports a series of sprocket wheels 18, 19, and 20 on each side of the machine about which suitable chains 21 are received forming a conveyor. Cross-bars 22 connected to the chains are arranged to receive racking boxes 23 which are provided with key slots 24 slidable over the cross-bars 22. Keys 25 are secured to the frame and guide the racking box in its upward movement. These keys are received in key-ways 26 in the racking boxes. The racking boxes are provided with spaced grooves 27 along each side thereof to receive the rims 28 of the pasted grid plates 29. These plates also have lugs 30 thereon for forming contacts when assembled in a battery, and an opening 31 is provided in the ribs on one side of the box for their reception.

Means is provided for operating the conveyor 21 which comprises a ratchet wheel 35 secured to the cross shaft 36 on which the sprocket wheels 20 are received. A pawl 37 pivoted on an arm 38 actuates the ratchet to move the ratchet a distance equivalent to the distance between each set of recesses 27 in the grid rack. The arm 38 is moved by means of a rod 39, having a contact 40 with the reciprocating table. Thus as the table 14 moves rearwardly, the ratchet is operated causing the conveyor to move forward, causing the grid rack to move the distance of one of the notches 27 for presenting a clear opening to the next grid plate being delivered forward by the table. In the grid pasting machine contemplating the use of this racking device, the pasted grids are pushed forward by successive grids being fed through the machine, and upon each forward movement of the table 14, a grid plate is carried forward therewith into the grid rack 23. Inasmuch as a portion of this grid plate being carried forward rests on the table 14, the entire grid plate cannot be pushed into the rack in one operation. As shown in Fig. 4, the forward ends of the grooves 27 are curved or cut away as indicated at 41 to provide ready access to the plates into the grooves. As shown in Fig. 4 the position of the grid racks is such that the grooves are slightly above the level of the top of the table 14, thus when the grid plate 29 is pushed into the rack it will be raised slightly from the table 14 whereby the return movement of the table 14 will not drag the battery plate from the rack. As the table moves rearwardly, the rack is moved upwardly and upon the next forward movement of the table an arm 50 which clears the table and the plates thereon, being pivoted at 51 to the frame and having a cross bar 52 in a position to be contacted by a table is carried forward by the table with the arm 50 contacting the grid plate and moving said grid plate into the rack a sufficient distance to retain the grid plate in the rack. A spring 53 attached to an extension of the arm 50 causes the arm 50 to retract upon rearward movement of the table. It will be noted that the lower and upper portion of each grid rack forms a half the distance between grooves whereby the next succeeding rack, which is arranged to abut the preceding rack will have its first groove in the proper spaced relation to the other grooves in each rack, whereby successive racks can be put into place on the conveyor and the machine continuously operated. The racks, after being filled, are removed when they reach the upper span of the conveyor and placed in suitable positions to permit drying of the pasted grid.

Having thus fully described my invention, what I claim as new and desire to secure by Letters Patent, is:

1. An unloading device for grid pasting machines comprising a vertically movable conveyor adjacent to the delivery end of said machine, means on said conveyor for removably attaching a racking box provided with spaced individual plate receiving recesses and means for intermittently moving said conveyor in timed relation to the discharge of said machine.

2. An unloading device for grid pasting machines comprising a vertically movable conveyor adjacent to the delivery end of said machine, means on said conveyor for removably attaching a racking box, said box divided into spaced individual plate receiving compartments, and means for intermittently moving said conveyor in timed relation to the discharge of said machine.

3. An unloading device for grid pasting machines comprising a conveyor adjacent to the delivery end of said machine, a reciprocating table, means on said conveyor for attaching a racking box, said box provided with a plurality of plate receiving recesses, means for intermittently moving said conveyor in timed relation to the discharge of said machine with the lower face of the plate receiving recess slightly above the plane of the table.

4. In combination, a grid pasting machine having a horizontally reciprocating table for feeding plates through said machine, a conveyor adjacent to the discharge end of said machine, means for attaching plate holders to said conveyor, and said reciprocating table pushing the plates into said holders.

5. In combination, a grid pasting machine having a horizontally reciprocating table for feeding plates through said machine, a conveyor adjacent to the discharge end of said machine, means for attaching plate holders to the said conveyor, means for intermittently moving said conveyor in timed relation to the reciprocating of said table, and said table pushing the plates into said holders.

6. In combination, a grid pasting machine having a reciprocating table intermittently discharging pasted grid plates, a conveyor adjacent to the discharge end of said machine, grid racks attachable to said conveyor, means for moving said racks intermittently in timed relation to said table and transverse to the movement of said table, said table delivering said plates partly into said rack, and auxiliary means for completing the delivery of the plates into said rack.

7. In combination, a grid pasting machine having a reciprocating table intermittently discharging pasted grid plates, a conveyor adjacent to the discharge end of said machine, grid racks attachable to said conveyor provided with spaced compartments therein, means for moving said racks intermittently in timed relation to said table and transverse to the movement of said table, said table delivering said plates into said rack, and auxiliary means for completing the delivery of the plates into said rack.

8. In combination, a grid pasting machine having a reciprocating table intermittently discharging pasted grid plates, a vertically movable conveyor adjacent to the discharge end of said machine, grid racks attachable to said conveyor having spaced compartments therein, the receiving faces of said compartments being tapered, means for moving said racks intermittently in timed relation to said table, and means for guiding said rack in its plate receiving position.

9. In combination, a grid pasting machine having a reciprocating table intermittently discharging pasted grid plates, a vertically movable conveyor adjacent to the discharge end of said machine, grid racks attachable to said conveyor having spaced compartments therein, the receiving faces of said compartments being tapered, said table delivering said plates partially into said rack, means for moving said racks intermittently in timed relation to said table, and means for guiding said rack in its plate receiving position.

10. In combination, a grid pasting machine having a reciprocating table intermittently discharging pasted grid plates, a conveyor adjacent to the discharge end of said machine, grid racks attachable to said conveyor having spaced compartments therein, the receiving faces of said compartments being tapered, said table delivering said plates partially into said rack, auxiliary means for completing the delivery of the plates into said rack, means for moving said racks intermittently in timed relation to said table, and means for guiding said rack in its plate receiving position.

ALBERT H. LUHRMAN.